Feb. 24, 1931. M. D. MOORE 1,794,239
DIRIGIBLE LIGHT
Filed April 11, 1929  2 Sheets-Sheet 1
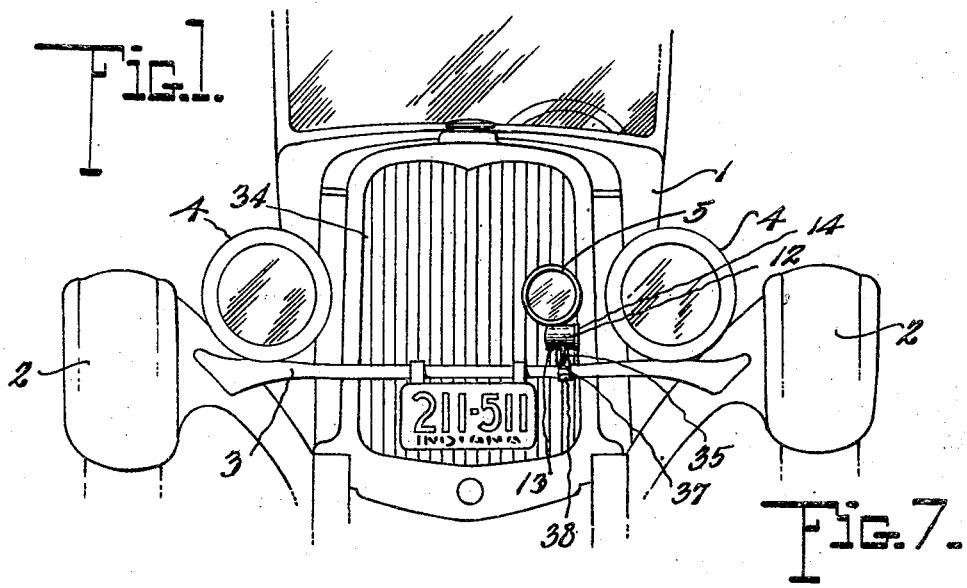
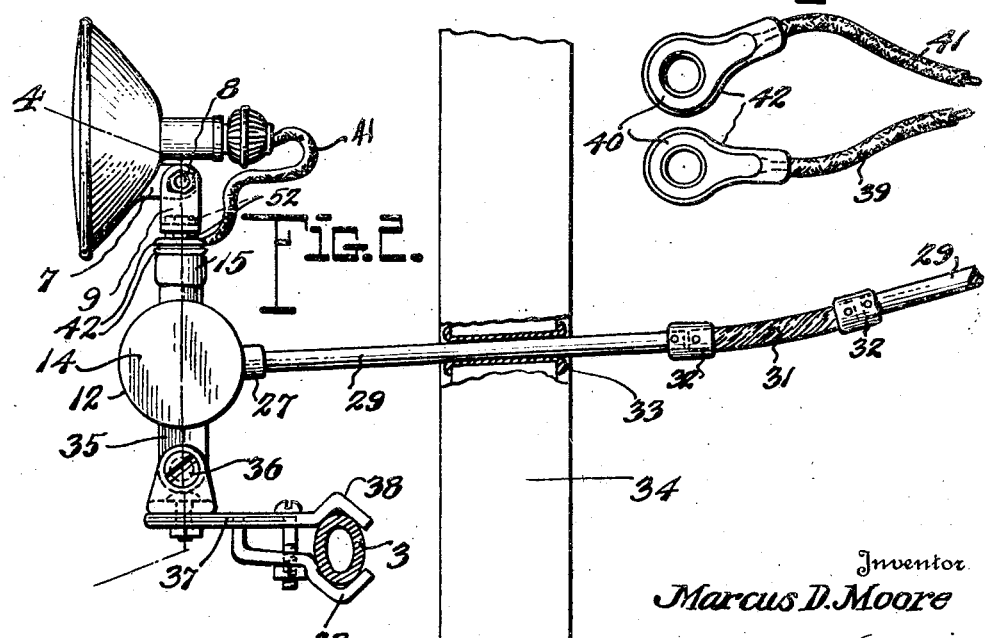
Inventor
Marcus D. Moore
By Edgar M Kitchin,
his Attorney

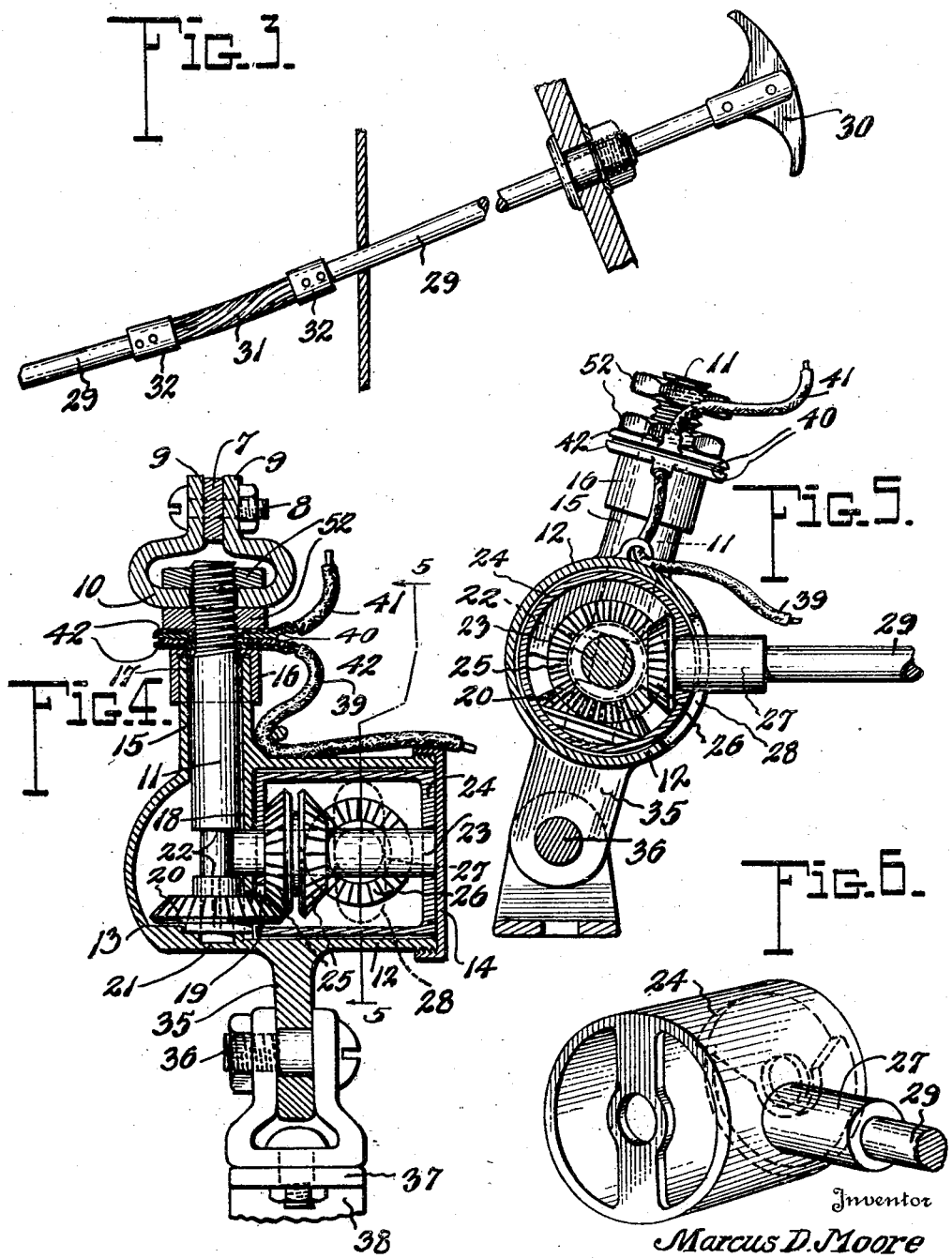

Patented Feb. 24, 1931

1,794,239

UNITED STATES PATENT OFFICE

MARCUS D. MOORE, OF BLOOMINGTON, INDIANA

DIRIGIBLE LIGHT

Application filed April 11, 1929. Serial No. 354,322.

This invention relates to improvements in that type of lights adapted for remote control and adjustment, and more particularly to such as are especially designed for use on automobiles or like vehicles, or for use under similar conditions.

The object in view is increased efficiency and durability in the construction of apparatus for enabling remote actuation and control of the location of light beams from a lamp by the effective adjustment of the lamp vertically and horizontally and in planes possessing components both of the vertical and the horizontal.

A more detailed object is the effective responsiveness of the light to remote control notwithstanding convenience of location of such remote control.

With these and further objects in view as will in part hereinafter become apparent and in part be stated, the invention comprises certain novel constructions, combinations, and arrangements of parts as subsequently specified and claimed.

In the accompanying drawings,—

Figure 1 is a view in front elevation of an embodiment of the present invention illustrated as applied to an automobile.

Figure 2 is a view in side elevation thereof on an enlarged scale, parts being broken away and parts of the automobile construction being seen in section.

Figure 3 is a view similar to Figure 2 of the remote control parts broken away from Figure 2, intermediate parts being omitted.

Figure 4 is a vertical section taken on the plane indicated by line 4—4 of Figure 2, and looking rearwardly, the lamp itself and the automobile parts being omitted, parts of the supporting bracket being broken away, and parts being seen in elevation.

Figure 5 is a vertical section taken on the plane indicated by line 5—5 of Figure 4, parts being seen in elevation.

Figure 6 is an enlarged, detailed, fragmentary perspective view showing the gear cage detached.

Figure 7 is a detailed plan view of the parts of the rotatable circuit maintainer or brush detached.

Referring to the drawings by numerals, 1 indicates an automobile or other vehicle having the usual fenders 2 and spreader bar 3 therefor on which spreader bar are mounted the customary head-lights 4, 4. Of course, the present invention may be applied directly to the head-lights themselves, but for the purpose of disclosing the subject matter of the present invention the same has been illustrated as incorporated in a spot-light construction preferably mounted on and carried by the bar 3.

The spot-light 5 may be a lamp of any desired construction supplied with current through a lead wire 41 and through the usual ground connection. The light 5 is provided with a supporting bracket arm 7 pivoted at 8 between the furcations of a bifurcated bracket 9. The bracket 9 is provided with a preferably substantially flat perforated base 10 through the perforation of which extends the upper end of a spindle or shaft 11 threaded and provided with clamping nuts 52, 52, at the respective faces of the flat portion 10. The nuts 52 are threaded to position clamping the bracket 9 firmly between the nuts, so that, while the bracket is easily detachable by merely removing the upper nut 52, and withdrawing the bracket, during use, the bracket is rigidly held by the clamping of the upper nut 52 against the base portion 10 of the bracket 9, and thence against the lower nut 52. The shaft or spindle 11 not only carries the light 5 in this manner, but is itself adapted to be rotated or oscillated for moving the light horizontally.

The shaft 11 is arranged within and upstands from a housing 12, the housing being generally cylindrical in shape, and for facility of access for assemblage and repair, a part of the housing 12 may be covered by a cap 14 detachably threaded onto the main body of the housing. Upstanding from and preferably formed integral with the housing 12 is a sleeve 15 which surrounds the upper portion of the shaft 11 to a place below the lower nut 52. The sleeve 15 is preferably provided with a detachable cap 16. Cap 16 is apertured in its end to accommodate the passage of shaft 11, and an appropriate packing 17 is provided between the cap 16 and sleeve 15 and between sleeve 15 and shaft 11 to form a dust-proof as well as lubricant-proof joint so as to prevent dust from finding its way into the housing 12 and prevent escape of lubricant therefrom.

The housing 12 is divided by a partition 18, providing a separate chamber 13 in which shaft 11 is located. Partition 18 is formed in its lower portion with a slot 19 of a size to accommodate the introduction and operation of a beveled gear 20. Gear 20 is keyed or otherwise readily removably fixed to the lower end portion of the shaft 11, so that the shaft may be inserted or withdrawn longitudinally when free, and will at the same time receive movement from gear 20 during normal operation. The lower end of shaft 11 is preferably stepped at 21 in the lower wall of housing 12, and the shaft 11 is also preferably provided just above the place of the gear 20 with an annular rabbet or groove 22 into which extends a shaft 23 journaled in the partition 18 and extending through the partition to the cap 14. The location of the inner end portion of the shaft 23 effectively prevents longitudinal displacement of the shaft 11, extending as it does into the groove 22 for that purpose.

That portion of housing 12 extending rearward from partition 18 is cylindrical, as clearly seen in Figure 5, and arranged within the cylindrical portion of housing 12 is a cylindrical gear cage 24. Cage 24 is sufficiently smaller in diameter than the cylindrical portion of housing 12 to allow free rotation of the cage within the housing, and the shaft 23 extends throughout the length of and finds bearing in the terminal spiders of cage 24. The ends of the cage 24 are not closed except by partial webs or spiders arranged to provide at that end adjacent the partition 18 an open space for the free accommodation of the marginal portion of gear 20 while allowing the desired rocking or oscillatory motion of the cage 24 about the axis of shaft 23, and, in fact, on the shaft. The shaft 23 carries a pair of beveled gears 25, one facing toward and meshing with gear 20, and the other facing in the opposite direction and meshing with a beveled gear 26 fixed to an outstanding sleeve 27 projecting through the cage 24 and through a slot 28 in the housing 12. Thus the sleeve 27 is adapted to be moved along the slot to oscillate the cage 24 about its axis of movement, but, as will become apparent hereinafter, this provision is to enable sleeve 27 to remain relatively stationary with respect to the length of slot 28 while the housing 12 moves relative to the sleeve 27.

Fixed to the sleeve 27 is an operating shaft or rod 29 which extends to the operating handle or remote control 30 located at any appropriate or convenient place for being grasped by the operator. The rod 29, when the device is applied to an automobile or like apparatus making it desirable to have the remote control 30 disposed at an angle to the approach to sleeve 27, is preferably provided intermediate its ends with appropriate universal joints to allow a degree of flexibility while enabling both torsional stresses and longitudinal thrusts to be transmitted from the remote control or handle 30 to the sleeve 27. The universal joints may be of the conventional type, but preferably consist of cable sections 31, 31, each bound at its ends in sleeves 32 fixed to the respective adjacent portions of the control rod 29. The rod 29 extends through the various parts of the vehicle to which the light is applied, according to the conditions and requirements of those parts, and may be provided with appropriate friction sleeves or guides as found desirable. For instance, where the structure is applied to an automobile, a sleeve 33 is preferably extended through and arranged as a fixed part of the radiator 34 of the automobile and the rod 29 extends through the sleeve 33 so as to in fact pass through the radiator without liability of injury thereto.

The housing 12 is provided with a preferably integral pendent fin or bracket arm 35, pivoted at 36, to swing vertically. The pivot 36 may be carried by any appropriate support, such as the upstanding arms of a bracket 37, having a clamp 38 detachably gripping the spreader bar 3.

Current is supplied to the light 5 through a conductor 39 leading from the battery, generator, or other appropriate source of current, to a rotary contact consisting of a pair of metallic rings 40, one superimposed on the other, and the top one connected by a conductor 41 with one side of the electric bulb for light 5, the other side of said bulb being grounded in the well known manner. Each of the rings 40 is surrounded by an appropriate insulator 42 located to protect the rings 40 against extraneous contact while leaving the rings themselves in contact as seen in Figure 4. The rings 40 surround the shaft 11 and are located between the lower nut 52 and the end of cap 15. It should be understood that when the parts are being assembled, the lower nut 52 will be threaded down on top of the uppermost insulator 42 sufficiently to insure good contact between the rings 40, but not sufficiently to create an objectionable friction. Thus, when the shaft 11 is oscillated, the conductor 41 and upper ring 40 are free to move with the shaft, nuts 52 and connected parts, while the lower ring 40 remains stationary.

In operation, when it is desired to raise or lower the light 5, it is only necessary to pull or push the remote control 30. A thrust on rod 29 will cause the housing 12 and connected parts to swing on the pivot 36 in a direction for lowering the light 5, and a pull on the rod 29 will swing the parts on pivot 37 in the opposite direction. Relative movement of the parts is accommodated by the presence of the slot 28 and the "walking" of the intermeshing gears as required. If it is desired to shift the light 5 horizontally, it is only necessary to twist the handle or remote control 30 in one direction or the other, according to the location desired. Rotation of rod 29 causes the gears 26, 25, and 20 to transmit corresponding movement to the shaft 11.

What is claimed is:—

1. In dirigible light construction, the combination of a cylindrical housing, a pivotal support for the housing, a light carried by the housing in condition to be moved to different angular relations incident to swinging of the housing upon its pivot, a cylindrical cage oscillatably mounted within the housing, whereby the housing may be moved to different angular positions without swinging the cage, actuating gearing within the cage, means for transmitting movement from the gearing to the light for swinging the light to different angular position, and means for swinging the housing on its pivot to different angular positions transversely of the planes of the first-mentioned swinging of the light.

2. In dirigible light construction, the combination of a cylindrical housing, a pivotal support for the housing, a light carried by the housing in condition to be moved to different angular relations incident to swinging of the housing upon its pivot, a cylindrical cage oscillatably mounted within the housing whereby the housing may be moved to different angular positions without swinging the cage, actuating gearing within the cage, means for transmitting movement from the gearing to the light for swinging the light to different angular positions, means extending from the cage through the housing for actuating said gearing, the said actuating means being connected to also serve to actuate the swinging of the housing.

3. In dirigible light construction, the combination of a cylindrical housing, a pivotal support for the housing, a light carried by the housing in condition to be moved to different angular relations incident to swinging of the housing upon its pivot, a cylindrical cage within the housing, actuating gearing within the cage, means for transmitting movement from the gearing to the light for swinging the light to different angular positions, means extending from the cage through the housing for actuating said gearing, the said actuating means being connected to also serve to actuate the swinging of the housing, and the housing being formed with a slot to accommodate the passage of said actuating means.

4. In dirigible light construction, the combination, with a housing, of a light actuating shaft extending therefrom, a light carried by said shaft, means for actuating the shaft for shifting the light, electric conductor rings surrounding said shaft, means clamping said rings in direct electrical contact without each other, allowing free movement of one of the rings on and relative to the other, means insulating the rings from surrounding material, a conductor connected to one of the rings from a source of current, and a conductor extending from the other ring to one side of the light.

5. In dirigible light construction, the combination, with a housing having a partition and being formed at one side of the partition substantially cylindrical, a shaft arranged in and extending from the housing at the opposite side of the partition from the cylindrical portion thereof, the shaft having an annular groove, a cage mounted in the cylindrical part of the housing to oscillate therein, a shaft journaled in the cage and extending through said partition into the groove in the first-mentioned shaft, a manually operative means extending through said housing into the cage, an actuating gear for the first-mentioned shaft, means within the cage for tarnsmitting movement from said manually operative means to said gear, and a light support carried by the first-mentioned shaft.

6. In a construction of the character set forth, a casing having a clindrical housing, means for pivotally supporting said casing with the axis of the cylindrical housing parallel to the axis of the pivotal supporting means, said casing carrying a driven shaft extending laterally therefrom, a cylindrical cage within said cylindrical housing of the casing an movable with respect thereto when said casing is swung on its pivot, a driving shaft extending laterally from said cage, and connections between said driving and driven shafts within said casing and said cage for turning the driven shaft when the driving shaft is turned.

In testimony whereof I affix my signature.

MARCUS D. MOORE.